Aug. 26, 1930. V. J. BURNELLI 1,774,474
AIRFOIL CONTROL MEANS
Filed July 27, 1929
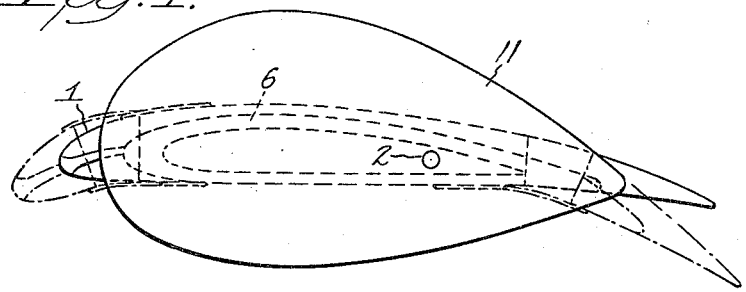
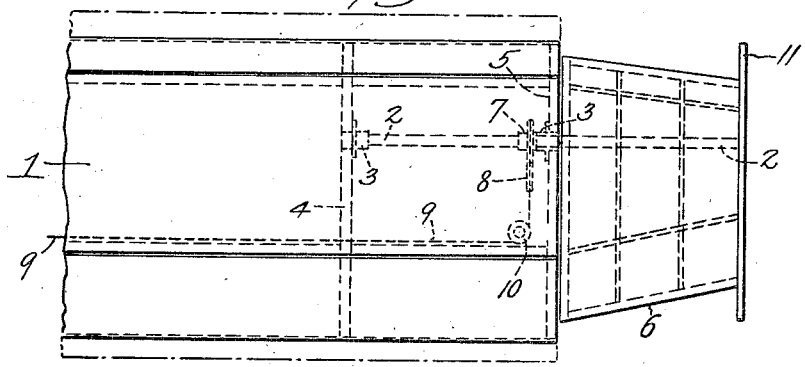
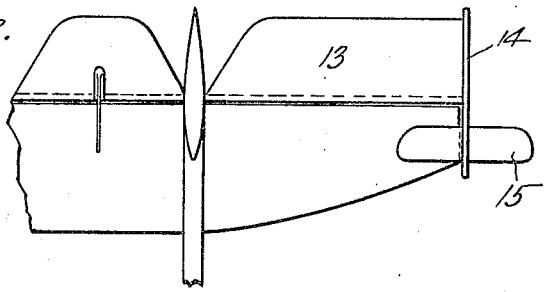
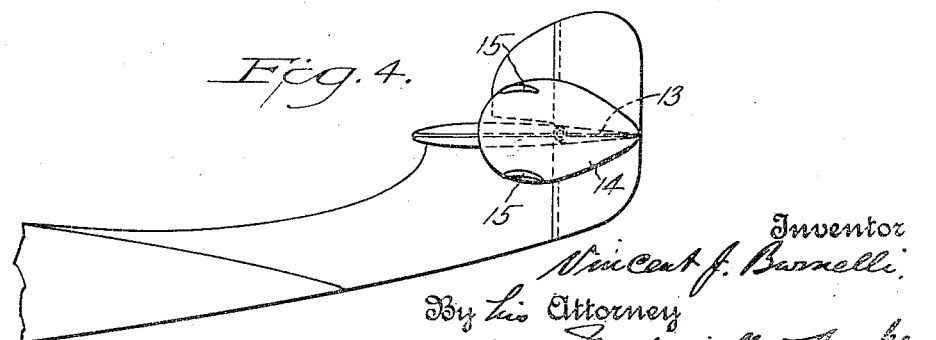
Inventor
Vincent J. Burnelli
By his Attorney
Frederick W. Baker Patented Aug. 26, 1930

1,774,474

UNITED STATES PATENT OFFICE

VINCENT J. BURNELLI, OF NEW YORK, N. Y., ASSIGNOR TO THE UPPERCU-BURNELLI CORPORATION, A CORPORATION OF DELAWARE

AIRFOIL CONTROL MEANS

Application filed July 27, 1929. Serial No. 381,432.

This invention relates to control means for airplanes and my improvements are directed to the use of vertical end plates or fins for airfoils to prevent the pressure losses which occur at the airfoil tips.

In the case of the main supporting airfoils I employ ailerons in the form of separate airfoils that normally constitute continuations of said supporting airfoils, but which are capable of rotation about an axis extending spanwise through the airfoils, to thereby control the direction of flight, said ailerons being carried by shafts that project from the ends of the airfoils and are provided with suitable means for their operation. The vertical fins, which prevent endwise loss of pressure, are attached to the ailerons, and are rotatable therewith.

Also the elevator or horizontal rudder is provided with vertical fins at its ends and they are provided with small balancing airfoils to facilitate the actuation of said elevator.

Other features and advantages of my invention will hereinafter appear.

In the drawing:

Figure 1 is a side elevation of an airfoil having controlling ailerons extended spanwise from its ends and vertical fins secured to the ailerons, Fig. 2 is a partial plan view of the airfoil, showing one end portion thereof with its vertical fin.

Fig. 3 is a partial plan view of a tail group, whereof the elevator has end fins secured thereto, said fin carrying balancing airfoils, and Fig. 4 is a side elevation of said tail group.

In the example of control elements, according to my invention, as applied to a supporting airfoil, attention is directed to Figures 1 and 2 of the drawing wherein there is illustrated a supporting airfoil 1 whose chord is variable in extent, said airfoil being extensible and contractible to suit different conditions of flight. In said views the solid lines show the airfoil contracted for high speed, and the dotted lines show it extended, for low speed and greater lift.

With this type of supporting airfoil I have found it desirable to employ ailerons that are extended spanwise from the airfoil ends instead of placing them at the trailing edge.

Therefore I provide a shaft 2, which is journalled in bearings 3, 3, secured respectively to the ribs 4, 5 of the supporting airfoil, and extending spanwise beyond said airfoil, where it carries an aileron 6 that is oscillatory with said shaft, to thereby perform its control functions.

Though in the partial view of Fig. 2 but one end portion of a supporting airfoil appears, with its aileron, it is to be understood that both end portions are similarly equipped.

Suitable means may be provided for rotating the shaft 2 in opposite directions to thereby operate the ailerons 6 for directional control of the airplane, the means herein partly shown comprising a sprocket 7 on the shaft, a chain 8 on said sprocket, and control wires 9 attached to the chain ends, said wires passing over pulleys 10 and extending in known manner to the operating means.

In the plan view, Fig. 2, only the upper wire 9 and upper pulley 10 appear.

Attached to the outer end of aileron 6 is a vertical plate or fin 11, having substantially the contour of a deep airfoil, said fin serving the purpose of preventing loss of pressure at the airfoil end, and particularly enabling the aileron to be subjected to the maximum degree of pressure so that it may function, for directional control, with high efficiency. Without the use of this fin the location of the aileron at the airfoil end would prove unsatisfactory, because the inrush of air at an airfoil tip diminishes the pressure effects both under and over the airfoil surfaces in that region.

In consequence, with an aileron occupying the position of an airfoil tip it is essential that its surfaces shall be protected against loss of pressure influence.

In Figs. 3 and 4, showing the tail group, the elevator 13 is provided at its ends with vertical fins 14 that are secured thereto for the purpose of preventing endwise pressure losses from said elevator, and said fins 14 are provided with the balancing vanes 15 to ease the load on the elevator for facilitating its operation.

Variations within the spirit and scope of my invention are equally comprehended by the foregoing disclosure.

I claim:—

1. The combination in an airplane having a supporting airfoil, of ailerons extending from the airfoil ends, and vertical fins carried by said ailerons at their ends, to be movable with said ailerons.

2. The combination in an airplane having an elevator of vertical fins carried by said elevator at its ends, and balancing means carried by said fins, in advance of said elevator.

3. The combination in an airplane having an airfoil, of a pressure retaining vertical fin carried at an end of said airfoil, and pressure balancing means carried by said fin, in advance of said airfoil.

4. The combination in an airplane having an elevator, of vertical fins carried by said elevator at its ends, said fins extending above and below said elevator over its full chord, and forwardly thereof, and small balancing vanes carried by said fins in advance of said elevator.

Executed this 24th day of July, 1929.

VINCENT J. BURNELLI.